United States Patent
Kiykioglu

(10) Patent No.: US 6,754,285 B1
(45) Date of Patent: Jun. 22, 2004

(54) SIGNAL CONDITIONING TECHNIQUES IN DMT-BASED TRANSMISSIONS

(75) Inventor: Serdar Kiykioglu, Plano, TX (US)

(73) Assignee: Centillium Communications, Inc., Fremont, CA (US)

( * ) Notice: Subject to any disclaimer, the term of this patent is extended or adjusted under 35 U.S.C. 154(b) by 752 days.

(21) Appl. No.: 09/628,385

(22) Filed: Aug. 1, 2000

(51) Int. Cl.[7] .......................... H04K 1/02; H04L 25/03; H04L 25/49

(52) U.S. Cl. ..................................... 375/297; 455/553.1

(58) Field of Search ................................ 375/297, 259; 330/10, 284, 129; 455/1–129

(56) References Cited

U.S. PATENT DOCUMENTS

| | | | |
|---|---|---|---|
| 5,848,041 A | * 12/1998 | Hirayama et al. | ........ 369/59.16 |
| 6,141,377 A | 10/2000 | Sharper et al. | ............. 375/222 |
| 6,584,160 B1 | * 6/2003 | Amrany et al. | ............. 375/296 |

FOREIGN PATENT DOCUMENTS

| | | | |
|---|---|---|---|
| EP | 0 851 575 A2 | 7/1998 | ............. H03F/1/32 |
| EP | 0 851 575 A3 | 12/1998 | ............. H03F/1/32 |

* cited by examiner

*Primary Examiner*—Stephen Chin
*Assistant Examiner*—Curtis Odom
(74) *Attorney, Agent, or Firm*—Fenwick & West LLP

(57) ABSTRACT

One embodiment of the present invention provides a method for conditioning a signal for transmission in a DMT-based communication system, the method comprising: converting the signal in a digital environment of the DMT-based communication system into a pre-clipped signal to avoid subsequent analog clipping in an analog environment of the DMT-based communication system. Another embodiment of the present invention provides a signal conditioner for conditioning a signal for transmission in a DMT-based transmission system, the signal conditioner comprising: a digital environment configured to convert the signal into a pre-clipped signal to avoid subsequent analog clipping in an analog environment of the DMT-based communication system.

25 Claims, 3 Drawing Sheets

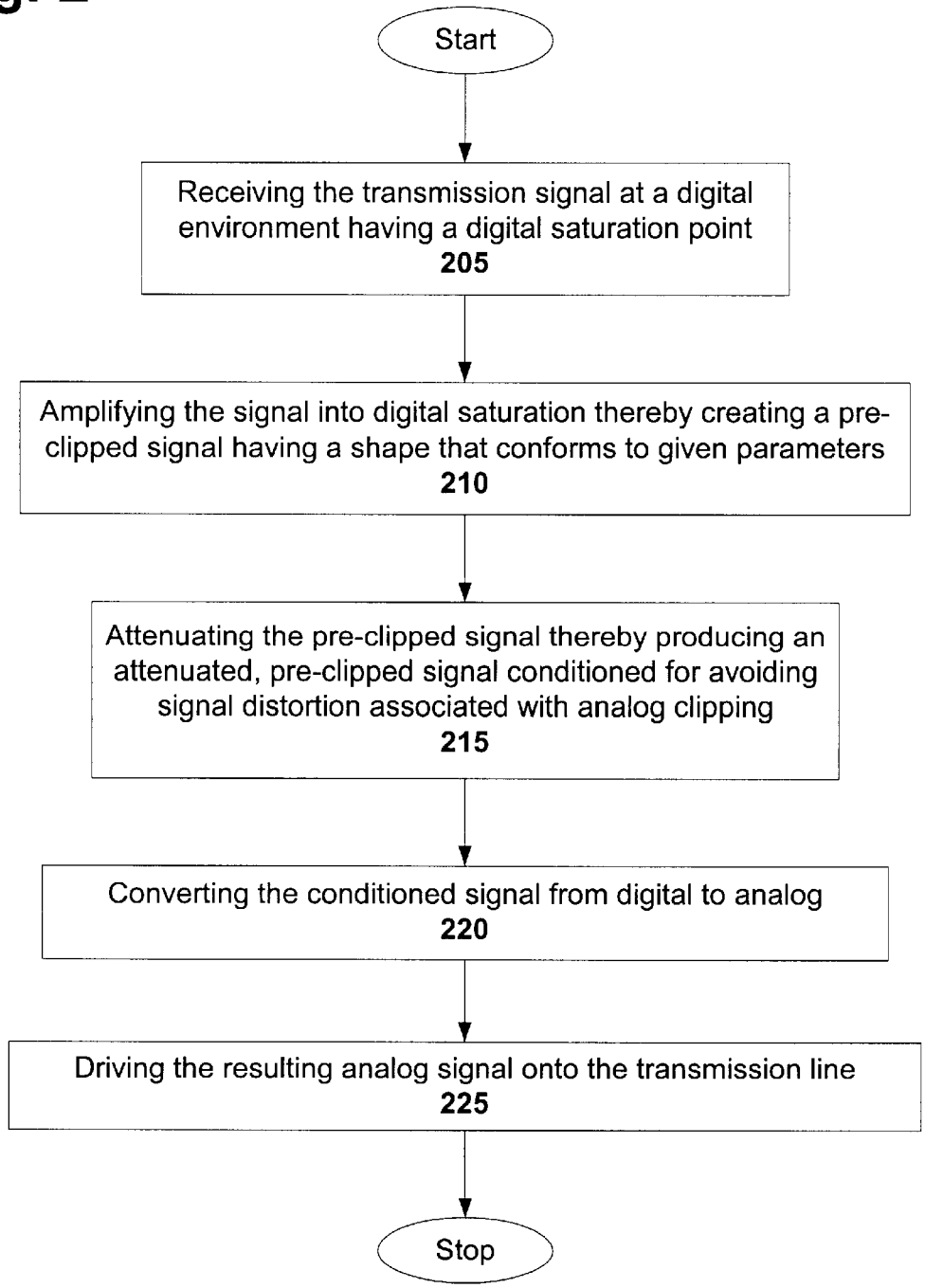

SIGNAL CONDITIONING TECHNIQUES IN DMT-BASED TRANSMISSIONS

BACKGROUND OF THE INVENTION

1. Field of the Invention

The invention relates to telecommunications, and more particularly, to transmission techniques that reduce bit error rates associated with analog clipping in discrete multitone-based transmission systems.

2. Description of the Related Art

Discrete multitone (DMT) is a standard modulation technique employed in various digital subscriber line (XDSL) communication systems. For example, asynchronous DSL (ADSL) systems commonly transmit data under a DMT modulation scheme. A DMT line code comprises multiple carriers or subchannels implemented through a Discrete Fourier Transform (DFT). Each subchannel is independently modulated to some carrier frequency. The number of subchannels available to carry information is generally equal to or slightly less than half of the DFT size. Each subchannel of a DMT line code employs a two-dimensional signal (e.g., a phase and amplitude modulated signal) equivalent to that of a passband single carrier system.

Quadrature amplitude modulation (QAM) is a modulation method that is used to encode a variable number of bits into such a two-dimensional signal. A number of bits are mapped into the in-phase and quadrature components of a complex symbol that is typically converted to an analog form, and then transmitted over the corresponding subchannel. The total average power of such a DMT-based system is the average power sum of each carrier as expressed as the sum of the average power of the ith carrier ($P_{Ti}$), from i=1 to m, where m is the number of carriers. Each of these carriers is associated with a crest factor. A crest factor is defined as the ratio of the peak to the root-mean-squared (RMS) level of the signal.

The crest factor for each carrier (the ratio of the carrier's peak voltage to the RMS level of that carrier) is referred to as $PAR_{carrier}$, for Peak-Average Ratio. In general, if the peaks of all carriers can be aligned, the peak voltage of a DMT system is equal to the peak voltage sum of all the carriers. Assuming that the average power of each carrier is the same, the crest factor of the DMT line code, referred to as $PAR_{DMT}$, can be calculated $$PAR_{DMT} = \sqrt{m} * \sum_{i=1 \ldots m} PAR_{carrier(i)}.$$

Clipping of a DMT transmission signal where the peaks of all the carriers are aligned is statistically an expected occurrence. More specifically, signal clipping will occur with a probability determined by the Gaussian distribution of the DMT transmission signal. With this anticipated clipping in mind, the analog line driver circuitry of the transmission path is designed to limit the voltage swing of the line driver amplifier so that only the required peak power is delivered to the transmission line. The result is that the power dissipation in the line driver amplifier is limited to no more that is allowed for a given bit error rate. However, a clipped transmission signal at an analog stage is associated with various problems.

For example, when an analog line driver is driven into an overload condition thereby clipping the signal being transmitted, a recovery period is required as the internal bias circuitry of the driver re-adjusts to linear operation (assuming the input stimulus causing the overload condition is eliminated). Moreover, the transmission signal is distorted during this recovery period. Noise associated with this distortion causes performance degradation (e.g., increase in bit error rate), and inefficient use of the allocated transmission signal power.

One solution for dealing with the problems associated with transmission signal clipping is to increase the voltage swing of the analog line driver. Such an increase allows for an increase in the transmission signal crest factor, which in turn reduces the clipping probability as well as the bit error rate. However, increasing the voltage swing of the analog line driver also increases the total power consumption (e.g., power consumption in the analog line driver increases).

What is needed, therefore, is a technique that provides a solution to the problems associated with analog clipping in a DMT-based transmission system.

BRIEF SUMMARY OF THE INVENTION

One embodiment of the present invention provides a method for conditioning a signal for transmission in a DMT-based communication system, the method comprising: converting the signal in a digital environment of the DMT-based communication system into a pre-clipped signal to avoid subsequent analog clipping in an analog environment of the DMT-based communication system. In one embodiment of this method, the signal is amplified until it has a shape that defines a linear performance envelope of the analog environment. In an alternative embodiment, the signal is amplified until it has a shape that corresponds to a maximum degree of anticipated analog clipping. The amplifying can be performed, for example, by a DSP process having a gain stage with a digital saturation point. In this embodiment, the digital environment can be associated with one of an overall unity gain or a less than unity overall gain.

Another embodiment of the present invention provides a system for conditioning a signal for transmission in a DMT-based transmission system, the system comprising: a digital environment configured to convert the signal into a pre-clipped signal to avoid subsequent analog clipping in an analog environment of the DMT-based communication system. In one embodiment of this system, the signal is amplified in the digital environment until it has a shape that defines a linear performance envelope of the analog environment. In another embodiment of this system, the signal is amplified in the digital environment until it has a shape that corresponds to a maximum degree of anticipated analog clipping. The digital environment can include, for example, a DSP process having a gain stage with a digital saturation point for amplifying the signal into digital saturation. In this embodiment, the digital environment can be associated with one of an overall unity gain or a less than unity overall gain.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2 is a flowchart diagram illustrating a method for conditioning a signal for transmission in a DMT-based communication system in accordance with one embodiment of the present invention.

DETAILED DESCRIPTION OF THE PREFERRED EMBODIMENTS

Figure 1:
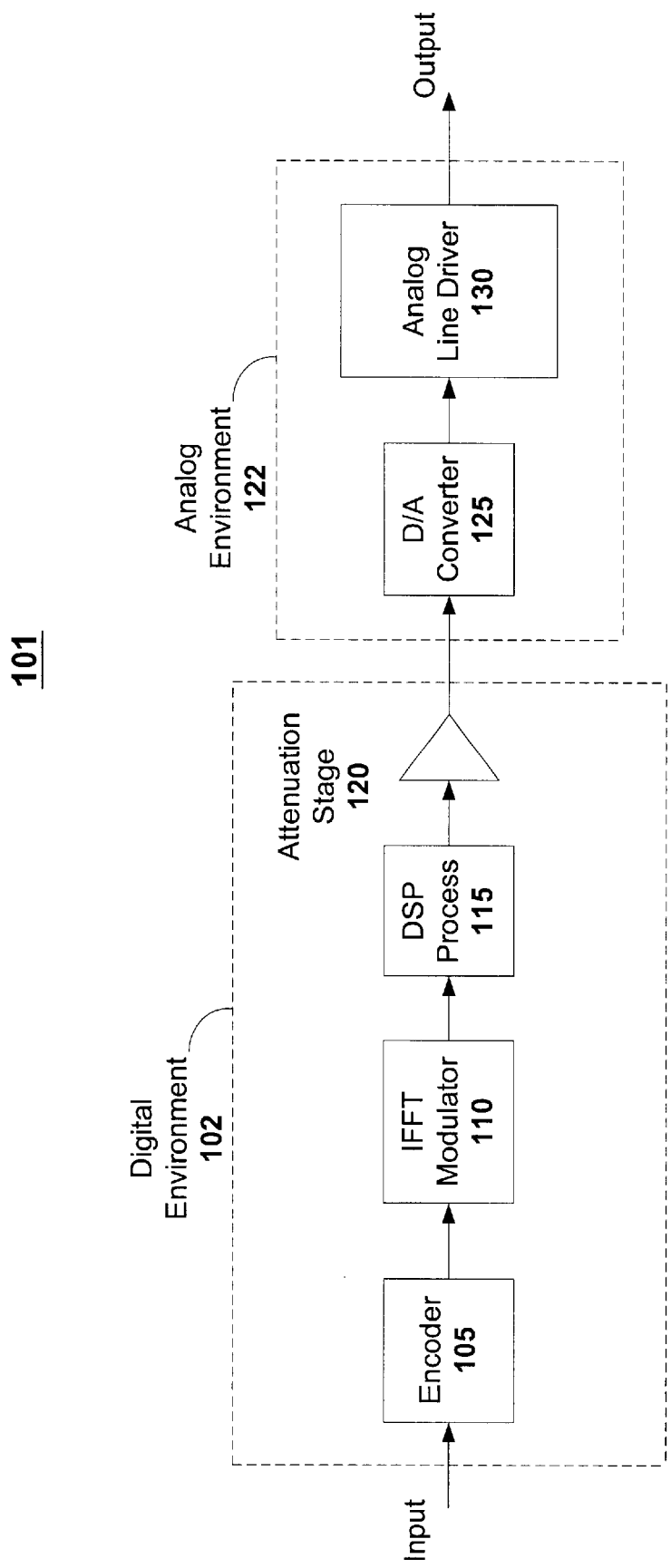
FIG. 1 is a block diagram of a DMT-based transmission system in accordance with one embodiment of the present invention.

FIG. 1 is a block diagram of a DMT-based transmission system in accordance with one embodiment of the present invention. This system 100 includes a digital environment 102 having an encoder 105, an Inverse Fast Fourier Transform (IFFT) modulator 110, a DSP process 115, and a gain adjust module 120. The system 100 also includes an analog environment 122 having a digital-to-analog (D/A) converter 125, and an analog line driver and hybrid circuit (analog line driver) 130. Encoder 105, IFFT modulator 110, DSP process 115 and attenuation stage 120 can be implemented, for example, in software, hardware, firmware or any combination thereof. D/A converter 125 and analog line driver 130 can be implemented, for example, as a conventional. analog front-end.

Such a system 100 might be employed, for instance, in a DSL modem. The input includes data ready for transmission. Such data might be from a customer's data terminal equipment or from the telephone company's network. This data is typically in the form of a block of bits after some preliminary processing (e.g., by a scrambler and a transmitter rate converter). A block of bits is usually equal to the number of bits supported by each subchannel of the DMT system.

Encoder 105 encodes the block of bits as a set of quadrature amplitude modulated (QAM) subsymbols. These QAM subsymbols are then applied to IFFT modulator 110, which modulates or combines the subsymbols onto the available subchannels, and combines all the subchannels together for transmission. In general, the IFFT modulator converts the QAM symbols into a time domain signal. A cyclic prefix (not shown) can be added after IFFT modulator 110 and before DSP process 115 to add separation between symbols in order to help the receiver to eliminate the inter-symbol interference between the subchannels as is conventionally done.

The signal produced by the IFFT modulator 110 (with or without the cyclic prefix) is then applied to DSP process 115. DSP process 115 can perform a number of functions. For example, DSP process 115 can be used or programmed to perform modulation, coding, error detection, and other algorithm-based functions. One skilled in the art understands that DSP process 115 can be implemented, for example, in software running on a DSP circuit, chip or chip set. In one embodiment, DSP process 115 includes a transmission filter having a gain stage, where the gain is greater than one. In this embodiment, the signal received by DSP process 115 is amplified by the gain stage until a certain degree of clipping is achieved. Note, however, that this intentional pre-clipping is proactively performed in digital environment 102 rather than in analog environment 122 as a reactive result of an overload condition.

The pre-clipping in this embodiment is achieved by using the digital saturation feature of DSP process 115. More specifically, the transmission filter (with gain stage) shapes the signal and reduces out-of-band signal components, and amplifies the in-band signal beyond the programmed digital saturation point of the filter. As such, the signal is pre-clipped at that digital saturation point. For discussion purposes, assume that the transmission filter has a digital saturation point of 7FFF (represented in hexadecimal format). By amplifying the signal beyond 7FFF, the output of the filter will be clipped at 7FFF. The higher the peak voltage produced by the gain stage, the greater the degree of clipping. For example, only exceeding the digital saturation point by 2 binary counts might produce a small degree of clipping such that only the top of the voltage peak curve is clipped at 7FFF. On the other hand, exceeding the digital saturation point by 50 binary counts might produce a large degree of clipping such that a sinusoidal test signal begins to resemble a square wave.

In one embodiment, the signal is pre-clipped to a degree equivalent to the analog clipping that would normally occur (given a particular line code) in a conventional system. Thus, in such an embodiment, various established signal parameters that are associated with the shape of a signal, such as the signal crest factor, can be maintained. For example, a crest factor of about 5.33 generally provides acceptable system performance (bit error rate of $10^{-7}$), although other crest factors can be used. Regardless, the pre-clipped signal can have a shape that is associated with a crest factor. In an alternative embodiment, the pre-clipped signal can have a crest factor lower than the established crest factor because the bit error rate will be reduced as a result of digitally pre-clipping the transmission signal. Thus, the same crest factor can be used to achieve a lower bit error rate, or a lower crest factor can be used to achieve the same bit error rate with improved system efficiency (e.g., decreased power consumption). A higher crest factor can also be used to achieve an even lower bit error rate, but at the cost of increased power consumption.

Attenuation stage 120 is provided to compensate for the additional gain introduced by DSP process 115. In one embodiment, the gain of the gain stage in DSP process 115 is G (where G>1), and the gain of attenuation stage 120 is 1/G resulting in an overall unity gain. Thus, the transmission signal is proactively amplified to a desired level of clipping by the gain stage of DSP process 115, and then attenuated back to its original level by gain adjust 120, but in a pre-clipped form. Non-unity gain ratios between the gain stage of DSP process 115 and attenuation stage 120 can be implemented as well. Whether the transmission signal is restored to its original level, or attenuated lower than its original level, or amplified above its original level by attenuation stage 120 depends on various system parameters such as the desired signal power, bit error rates, and the prescribed crest factor.

The pre-clipped transmission signal from the output of attenuation stage 120 is then applied to the analog front-end for further processing. In the embodiment shown, the pre-clipped transmission signal is applied to D/A converter 125, which converts the signal to its analog equivalent. The resulting analog signal is still shaped or pre-clipped like its digital equivalent. This analog signal is then applied to analog line driver 130, which drives the analog, pre-clipped signal onto the transmission line (not shown) operatively coupled to analog line driver 130. A hybrid circuit may also be included in the analog line driver for performing 2-to-4-wire conversion as is conventionally done. In one embodiment, the resulting analog transmission signal has the same output power as the analog transmission signal of a conventional system, but no distortion associated with analog clipping.

Those skilled in the art will recognize various other configurations for DMT-based transmission systems that may include other system modules or components not shown in FIG. 1 (e.g., a module scrambler or a cyclical redundancy check module). Likewise, those skilled in the art will recognize other configuration systems in accordance with other embodiments of the invention that do not include the components shown in FIG. 1.

Regardless of the system configuration employed, the principles of the present invention can be implemented so that a pre-clipped transmission signal is presented to the analog line driver for transmission onto the transmission line operatively coupled to analog line driver 130. This pre-clipped signal essentially has a shape that conforms to the linear performance envelope of the analog environment, and in particular, to that of analog line driver 130. In general, the linear performance envelope of an analog device defines the operation region where that analog device is not in saturation. As such, the analog front-end or environment of this embodiment is never driven into an overload condition or non-linear operation. Thus, various signal parameters associated with the pre-clipped shape cannot be exceeded, and analog clipping is avoided. The ill effects associated with such analog clipping are accordingly advantageously eliminated.

FIG. 2 is a flowchart diagram illustrating a method for conditioning a signal for transmission in a DMT-based communication system in accordance with one embodiment of the present invention. Portions of this method (e.g., step 210) may be implemented, for example, in software running on a DSP chip, chip set or circuit, or other suitable digital processing environment. The method begins by receiving 205 the transmission signal to be conditioned at a digital environment (e.g., a DSP) having a digital saturation point. In one embodiment, this received signal is the output signal of an IFFT modulator as shown in FIG. 1. Those skilled in the art, however, will recognize various other sources of the received signal.

The method continues by amplifying 210 the signal into digital saturation thereby creating a pre-clipped signal having a shape that conforms to any number of given parameters. In one embodiment, this amplification is achieved by a gain stage of a DSP process, wherein a digital saturation point is programmed to be substantially equal to, or slightly less than, the peak voltage swing of the system's analog line driver. The voltage peak of the amplified signal cannot exceed the digital saturation point. Generally, the signal can be amplified until it has the desired shape, or the desired degree of clipping. In one embodiment, the signal is amplified until it achieves the same degree of clipping as would have occurred, given a particular line code, to a signal at the analog output of a conventional system. In this embodiment, the maximum degree of anticipated clipping (whether actual or empirical) that occurs in the analog environment is effectively modeled in the digital environment. However, the signal distortion associated with clipping in the analog environment is avoided. The resulting pre-clipped signal essentially has a shape that conforms to the linear performance envelope of the analog line driver. As such, the analog line driver is never exposed to an overload condition or non-linear operation.

Once the signal is pre-clipped at the appropriate level, the method further includes attenuating 215 the pre-clipped signal thereby producing an attenuated, pre-clipped signal. In one embodiment, this is achieved by an attenuation stage having a gain that, when combined with the gain of the gain stage, provides an overall unity gain. Thus, in this embodiment, the pre-clipped signal received by the attenuation stage is attenuated back down to its original level before the signal was amplified at the gain stage. However, the attenuated signal retains various signal parameters provided in the amplifying step, such as the general clipped shape and the crest factor. When this predefined signal is later converted to its analog equivalent and applied to the analog line driver, analog clipping is avoided. This is because the signal levels that would have caused such analog clipping have already been pre-clipped in the digital environment.

In alternative embodiments, the overall gain scheme need not provide a unity is gain. For example, the overall gain might be less than unity (e.g., 0.8). Other gain schemes can be implemented as well depending on the desired system performance and parameters such as transmission power and bit error rates. Regardless of the scheme employed, whether an amplification means combined with an attenuation means, or other scheme, the signal is converted into a pre-clipped signal to avoid subsequent analog clipping in the analog environment of the DMT-based communication system. Steps 210 and 215 can therefore be replaced by a single step of converting the signal into a pre-clipped signal to avoid subsequent analog clipping in an analog environment of the DMT-based communication system.

The method continues with converting 220 the attenuated, pre-clipped signal from digital to analog. This can be accomplished using a conventional D/A converter as shown in FIG. 1. The resulting analog signal is still shaped or pre-clipped like its digital equivalent. The method further includes driving 225 the resulting analog, pre-clipped signal onto the transmission line. In general, this signal has the shape of a signal that cannot exceed established parameters. For example, in one embodiment, this signal has the shape of a signal that cannot exceed an established crest factor. In another embodiment, this signal has a shape that exhibits the same degree of clipping that would have occurred (given a particular line code) in a conventional system due to analog clipping. Regardless, the resulting pre-clipped signal conforms to the shape of a signal that cannot cause the analog line driver to go into non-linear operation as a result of an input overload condition.

Figure 3A:
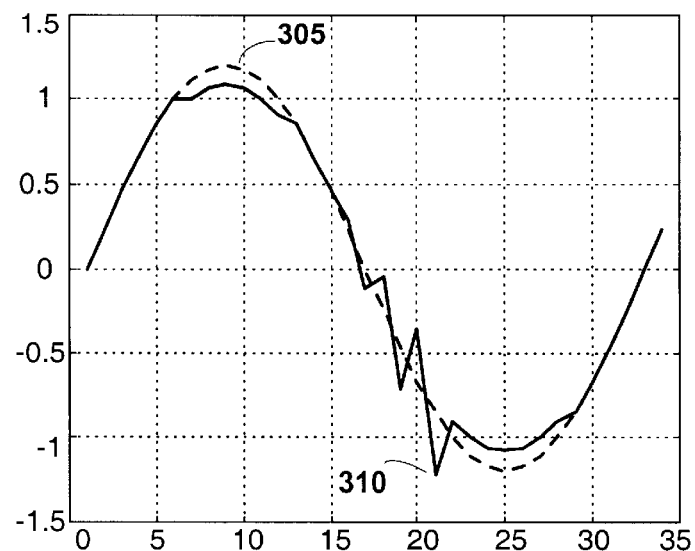
FIG. 3a is a graph illustrating the effects of analog clipping on a transmission signal.

FIG. 3a illustrates the effects of analog clipping on a transmission signal. The signal 305 (shown as a dashed line) represents the output signal of a D/A converter in a conventional DMT-based system. In general, this signal will be applied to an analog line driver for transmission over the communication link. As can be seen, signal 305 is not pre-clipped prior to being applied to the analog line driver. The jagged, noisy signal 310 represents the output signal of the analog line driver that is responsive to the input signal 305. Because signal 305 is not pre-clipped, the analog line driver is susceptible to an input overload condition resulting in analog clipping as explained above. As the system attempts to recover from such an overload condition, signal 310 at the output of the analog line driver is distorted and noisy resulting in degraded system performance such as increased bit error rates.

Figure 3B:
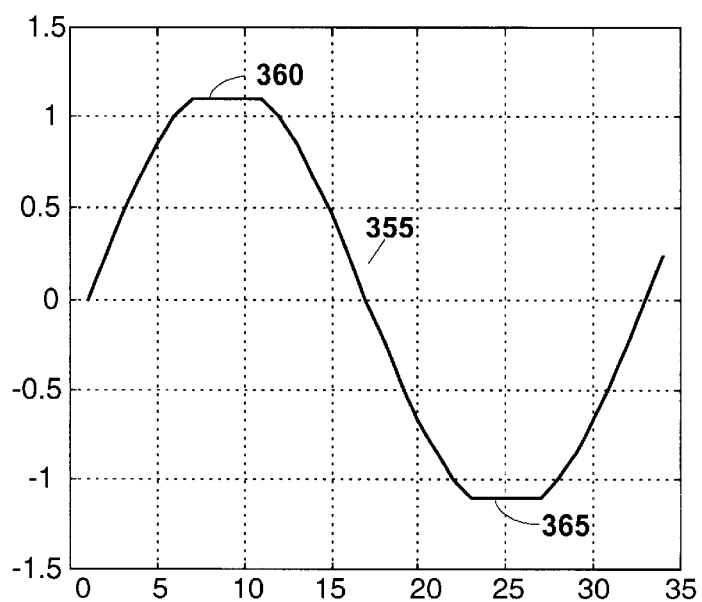
FIG. 3b is a graph illustrating the effects of digitally pre-clipping a transmission signal in accordance with one embodiment of the present invention.

FIG. 3b illustrates the effects of digitally pre-clipping a transmission signal in accordance with one embodiment of the present invention. The pre-clipped signal 355 represents the output signal of a D/A converter in a DMT-based system in accordance with one embodiment of the present invention. This pre-clipped signal is then applied to an analog line driver for transmission over the communication link. The resulting output signal of the analog line driver will have a shape that cannot exceed certain signal parameters based on pre-clipped signal 355. For example, the resulting output signal of the analog line driver might have a shape that is the same as the shape of the maximum output signal of the analog line driver, without the distortion due to clipping. Moreover, clip points 360 and 365 might correspond to the peak voltage swing limits of the analog line driver. The shape of signal 355, therefore, would conform to the linear performance envelope of the analog line driver.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for conditioning a signal for transmission in a DMT-based communication system, the communication system comprising a digital environment and an analog environment, the method comprising:
    amplifying the signal in the digital environment into digital saturation thereby creating a pre-clipped signal having a shape that conforms to a linear performance envelope associated with the analog environment; and
    attenuating the pre-clipped signal thereby producing an attenuated, pre-clipped signal conditioned for avoiding analog clipping.

2. The method of claim 1 further comprising:
    converting the attenuated, pre-clipped signal to its analog equivalent; and
    driving the resulting analog signal onto a transmission line.

3. The method of claim 1, wherein the amplifying is performed by a DSP process having a gain stage with a digital saturation point.

4. The method of claim 3, wherein the digital saturation point corresponds to a voltage swing limit associated with an analog voltage line driver included in the analog environment.

5. The method of claim 1, wherein the shape of the pre-clipped signal is based on a maximum degree of anticipated analog clipping.

6. The method of claim 1, wherein the attenuating is performed by a DSP process having an attenuation stage.

7. The method of claim 1, wherein a gain associated with the amplifying step and a gain associated with the attenuating step produce an overall unity gain.

8. A DMT-based transmission system for conditioning a signal, the system having a digital environment and an analog environment, the system comprising:
    a DSP in the digital environment for receiving the signal to be conditioned, the DSP further comprising:
        a gain stage for amplifying the signal into digital saturation thereby creating a pre-clipped signal having a shape that conforms to a linear performance envelope associated with the analog environment; and
    an attenuation stage coupled to the DSP in the digital environment, the attenuation stage for attenuating the pre-clipped signal thereby producing an attenuated, pre-clipped signal conditioned for avoiding analog clipping.

9. The system of claim 8 further comprising:
    a A/D converter coupled to the attenuation stage, the A/D converter for converting the attenuated, pre-clipped signal to its analog equivalent; and
    an analog line driver coupled to the A/D converter, the analog line driver for driving the resulting analog signal onto a transmission line.

10. The system of claim 8, wherein the gain stage has a digital saturation point that corresponds to a voltage swing limit associated with an analog voltage line driver coupled to the DSP, the analog line driver for driving the resulting analog signal onto a transmission line.

11. The system of claim 8, wherein the shape of the pre-clipped signal is based on a maximum degree of anticipated analog clipping.

12. The system of claim 8, wherein the attenuation stage is implemented by a DSP process in the DSP.

13. The system of claim 8, wherein a gain associated with the amplifying step and a gain associated with the attenuating step produce an overall unity gain.

14. A computer program product, stored on a computer readable medium, for conditioning a signal for transmission in a DMT-based communication system, the system having a digital environment and an analog environment, wherein in response to the computer program product being executed by a processor, the processor performs the steps of:
    amplifying the signal in the digital environment into digital saturation thereby creating a pre-clipped signal having a shape that conforms to a linear performance envelope associated with the analog environment; and
    attenuating the pre-clipped signal thereby producing an attenuated, pre-clipped signal conditioned for avoiding analog clipping.

15. The computer program product of claim 14, wherein the computer readable medium and the processor are included in one of a DSP chip, a DSP chip set and a DSP circuit.

16. A method for conditioning a signal for transmission in a DMT-based communication system, the method comprising:
    amplifying the signal in a digital environment of the DMT-based communication system into digital saturation to avoid subsequent analog clipping in an analog environment of the DMT-based communication system,
    wherein the amplifying is performed by a DSP process having a gain stage with a digital saturation point.

17. The method of claim 16, wherein the digital saturation point corresponds to a voltage swing limit associated with an analog voltage line driver included in the analog environment.

18. The method of claim 16, wherein the signal is amplified until it has a shape that defines a linear performance envelope of the analog environment.

19. The method of claim 16, wherein the signal is amplified until it has a shape that corresponds to a maximum degree of anticipated analog clipping.

20. The method of claim 16, wherein the digital environment is associated with one of an overall unity gain or a less than unity overall gain.

21. A signal conditioner for conditioning a signal for transmission in a DMT-based transmission system, the signal conditioner comprising:
    a digital environment configured to amplify the signal into digital saturation to avoid subsequent analog clipping in an analog environment of the DMT-based communication system, wherein the digital environment includes a DSP process having a gain stage with a digital saturation point for amplifying the signal into digital saturation.

22. The signal conditioner of claim 21, wherein the digital saturation point corresponds to a voltage swing limit associated with an analog voltage line driver included in the analog environment.

23. The signal conditioner of claim 21, wherein the signal is amplified in the digital environment until it has a shape that defines a linear performance envelope of the analog environment.

24. The signal conditioner of claim 21, wherein the signal is amplified in the digital environment until it has a shape that corresponds to a maximum degree of anticipated analog clipping.

25. The signal conditioner of claim 21, wherein the digital environment is associated with one of an overall unity gain or a less than unity overall gain.

* * * * *